United States Patent [19]

Watson

[11] Patent Number: 4,609,010
[45] Date of Patent: Sep. 2, 1986

[54] FLUID INLET DISTRIBUTOR

[75] Inventor: Frederick D. Watson, Houston, Tex.

[73] Assignee: Petrolite Corporation, St. Louis, Mo.

[21] Appl. No.: 187,279

[22] Filed: Sep. 15, 1980

[51] Int. Cl.⁴ .............................................. F16K 24/00
[52] U.S. Cl. .................... 137/587; 137/592; 137/561 A; 204/302; 55/174
[58] Field of Search .................... 137/592, 587, 561 A; 204/302; 55/174

[56] References Cited

U.S. PATENT DOCUMENTS

| | | | |
|---|---|---|---|
| 1,081,132 | 12/1913 | Morison | 137/592 |
| 3,458,429 | 7/1969 | Watson et al. | 204/302 |
| 3,649,516 | 3/1972 | Cole et al. | 204/302 |
| 3,672,127 | 6/1972 | Mayse et al. | 55/174 |
| 4,129,146 | 12/1978 | Schuler | 137/587 |
| 4,149,958 | 4/1979 | Martin | 204/302 |
| 4,161,963 | 7/1979 | Stevens | 137/592 |
| 4,182,672 | 1/1980 | Martin | 204/302 |

*Primary Examiner*—A. Michael Chambers
*Attorney, Agent, or Firm*—Pravel, Gambrell, Hewitt & Kimball

[57] ABSTRACT

A fluid inlet distributor for a fluid treating vessel, comprising a chamber, preferably horizontally elongated, provided with at least one horizontal row of orifices along one longitudinal side, fluid inlet means, and at least one conduit, open at its bottom end, communicating with the chamber and extending downwardly therefrom. The chamber is otherwise closed. The distributor is useful for uniform feeding of an incoming fluid for horizontal flow in a fluid treating vessel.

14 Claims, 8 Drawing Figures

1

FLUID INLET DISTRIBUTOR

FIELD OF THE INVENTION

This invention relates to apparatus useful for uniform feeding of an incoming fluid for substantially horizontal flow in a fluid treating vessel. More particularly, the invention relates to improved fluid inlet distributors well suited for use in electric treating apparatus for dehydrating and/or desalting emulsions such as crude petroleum oils, and particularly well suited for use in plural stage treating apparatus of this type.

BACKGROUND OF THE INVENTION

It is conventional to desalt or dehydrate oil-continuous emulsions by introducing such emulsions directly into an electric treating field of sufficient intensity to coalesce the suspended droplets of the dispersed phase into masses of sufficient size to gravitate from the oil. The dispersed phase of such emulsions is composed of a material, usually aqueous, that is sufficiently immiscible with the oil to produce an internal or dispersed phase. Initially, the dispersed droplets are of such small size or are so stabilized that they will not readily gravitate from the oil phase. However, the electric field coalesces such dispersed droplets, and it is found that the resulting coalesced masses gravitate rapidly from the oil, usually in the same container as that in which electric treatment takes place. In a desalting operation, a quantity of water may be mixed with the incoming crude oil in a valve or other mixer, all as well known, so that a more complete removal of salt from the oil may be accomplished. Typical of such prior art dehydrator/desalters are those described in the following U.S. Pat. Nos.: 1,838,922 2,513,386 2,855,360 3,141,000 3,531,393 2,033,446 2,527,690 2,880,158 3,207,686 3,577,336 2,041,954 2,543,996 2,892,768 3,250,695 3,649,516 2,072,888 2,557,847 2,894,895 3,458,429 3,672,127 2,443,646 2,848,412 2,963,414 3,592,756 3,736,245; and German Pat. No. 1,014,076 (Helmut Stock; Aug. 22, 1957).

U.S. Pat. Nos. 4,149,958 and 4,182,672 to Robert B. Martin disclose apparatus and processes for desalting or dehydrating emulsions of the type above described, wherein the apparatus has a plurality of electrified coalescing stages in a single vessel, wherein the stages are hydraulically substantially independent and adapted for parallel or series stage operations. The expression "electrified" denotes the presence of an electric field, as above described. In one embodiment shown by Martin, two or more electrified stages, each separately energized, are operated in parallel to proportionately increase vessel throughput capacity. In another embodiment, especially designed for desalting, series operation is employed, wherein each successive stage receives the product of the preceding stage as feed, with fresh and-/or recycled water being added.

The embodiments specifically illustrated and described in the Martin patents incorporate centrally positioned emulsion inlet distributors between horizontally disposed planar permeable electrodes in vertically spaced relationship. Among the distributors there disclosed are those in the form of pipes or box-like ducts provided with rows of orifices along their lengths.

In the concurrently filed application of James R. Robinson, Ser. No. 187,282, filed Sept. 15, 1980, improved apparatus of this type, wherein the emulsion being treated is introduced at one wall of the vessel and caused to flow to the opposite wall between horizontal planar permeable electrodes, is disclosed and claimed.

It is known to employ a distributor in the form of an inverted trough, with orifices along the sides of the trough. A distributor of this type, sometimes referred to as a "pan-type" distributor, is shown in U.S. Pat. No. 3,458,429 to Frederick D. Watson and Weldon D. Mayse and is used for feeding incoming liquid into a container of liquid for uniform upward flow of the incoming liquid through the liquid in the container. A variation of such a distributor is shown in U.S. Pat. No. 3,649,516 to Ernest A. Cole, Jr., Frederick D. Watson, and Weldon D. Mayse. A distributor employing a baffle having orifices therein is shown in U.S. Pat. No. 3,672,127, to Weldon D. Mayse and Frederick D. Watson.

It is an object of this invention to provide an improved and simplified fluid inlet distributor for feeding an imcoming fluid in substantially uniform horizontal flow in a fluid treating vessel.

It is a further object of this invention to provide such a fluid inlet distributor well suited for use in electric treating apparatus for dehydrating and/or desalting emulsions such as crude petroleum oil.

It is a still further object of this invention to provide such a distributor particularly adapted for use in plural stage electric treating apparatus of this type.

SUMMARY OF THE INVENTION

The above and other objects of the invention are achieved by providing a fluid inlet distributor for a fluid treating vessel, which distributor includes a chamber having one or more rows of orifices disposed horizontally along its length, fluid inlet means to said chamber, and one or more conduits open at their bottom ends, joined to and in fluid communication with the chamber and extending downwardly from therefrom. The chamber is otherwise closed.

The chamber and conduits may both be tubular in form, but other shapes are not excluded. For example, the chamber may have a rectangular or arcuate cross-section. In an embodiment of this invention adapted to be positioned at the side of a vessel having a circular cross-section, as disclosed and claimed in the above referred to Robinson application, Ser. No. 187,282, hereby incorporated by reference, the conduits are preferably disposed in an arcuately downward direction in planes perpendicular to the axis of the chamber, the concave sides of the arcs being on the same side of the distributor as the orifice row.

For use in two stage parallel operation, the distributor may be provided with two rows of orifices facing in the same direction. These orifice rows may be on separate subchambers of the distributor having an upper and lower subchamber in fluid communication with each other with downwardly extending conduits joined to the lower subchamber. However, each subchamber may be provided with such conduits, with the subchambers in fluid communication with a common inlet means.

For use in two stage series operation, a distributor system comprising two distributors each having a single row of orifices is provided. The distributors may fit against each other, or may be of integral construction, i.e., share in part a common wall, but with the top of one, including the portion provided with orifices, extending above the other, which is unobstructed.. The orifices in the upper row of such systems may be larger than those in the lower row; and/or there may be more orifices in the upper row than in the lower row.

BRIEF DESCRIPTION OF THE DRAWINGS

Referring to the appended drawings.

DESCRIPTION OF THE SPECIFIC EMBODIMENTS

Figure 1:
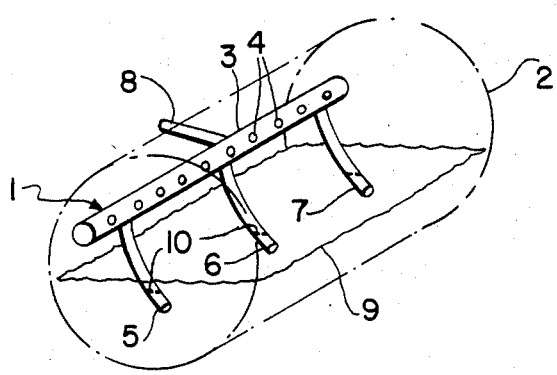
FIG. 1 is an isometric view of one embodiment of the fluid inlet distributor of the present invention intended for use in a horizontal single stage cylindrical treating vessel, the distributor being shown in relation to the sides of such a vessel.

FIG. 1 illustrates one embodiment of the fluid inlet distributor of the invention. The distributor 1 is shown in relation to the sides of a horizontally positioned treating vessel 32 in which it is used, the distributor being intended for single stage treatment. The distributor, as shown, consists of a chamber in the form of a horizontal pipe 3, closed at both ends and having a row of orifices 4 along its length; and a plurality of conduits, shown as 5, 6 and 7, which extend downwardly in generally circular arcs adapted to be concentric with a side of the treating vessel 1 when positioned therein adjacent to said side. The concave sides of the arcs are on the same side of the distributor as the orifices 4. Conduits 5, 6, and 7 are connected to and communicate hydraulically with pipe 3 and are open at their bottom ends. Pipe 3 is provided with fluid inlet means, shown here as a centrally positioned short conduit 8. When the distributor is positioned in a treating vessel 2, conduits 5, 6, and 7 are adapted to extend below the level 9 of water present in the vessel.

The distributor of FIG. 1 is capable of maintaining a substantially uniform flow of fluid through orifices 4 based on the differential head of water between the level 9 of water in the vessel 1 and the level 10 obtaining in conduits 5, 6, and 7.

When only water is present in the vessel, the water level 9 is the same as water level 10 and no differential head exists. However, when an oil-water emulsion, for example, is pumped into the distributor via inlet conduit 8, the emulsion tends to exit the distributor by conduits, 5, 6, and 7 rather than by orifices 4. To do this, the emulsion has to push the water level in these conduits down. This force is resisted by the head of water in the vessel corresponding to level 9 (which level remains essentially constant) until the emulsion overcomes the orifices resistances and flows from the orifices 4.

At this point of equilibrium (the designed point), the height of water level 9 above water level 10 in conduits 5, 6, and 7, is established by the resistance of the orifices (i.e., the pressure drop or head across the orifices). Outside the conduits, the head is that of level 9 minus that of level 10 in feet of *water*. Inside the conduits, the same height difference provides a head in feet of *oil*. The difference between the head of water outside the conduits and the head of oil inside the conduits is the driving force or head for the orifices 4 under design flow conditions.

Figure 2:
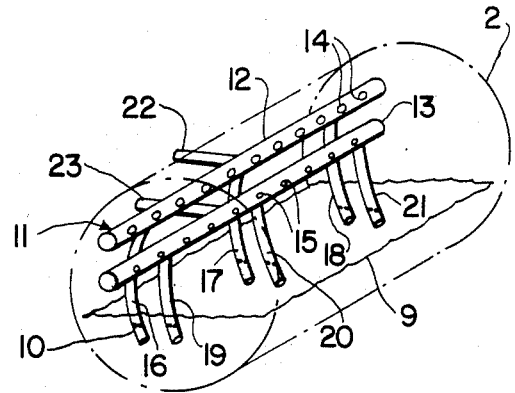
FIG. 2 is an isometric view of a distributor system intended for use in a two stage series treating vessel.

FIG. 2 illustrates a fluid-distributor system 11 intended for use in a two stage series treating vessel. As shown the system comprises two distributors 12 and 13 of the type shown in FIG. 1, adapted for placement in vertically spaced relationship at the side of treating vessel 2. However, the upper distributor 12 is provided with orifices 14 which are larger than the orifices 15 provided in the lower distributor 13. Alternatively, or in addition, a greater number of orifices may be provided in distributor 12 than in distributor 13. Conduits 16, 17, and 18, provided for distributor 12 are, for structural simplicity, suitably spaced in staggered relationship with conduits 19, 20, and 21, provided for distributor 13. Inlet means, shown here as short lengths of conduits 22 and 23, are provided for distributor chambers 12 and 13, respectively. Other reference numerals correspond to those employed in FIG. 1 for the same or similar features.

Figure 3:
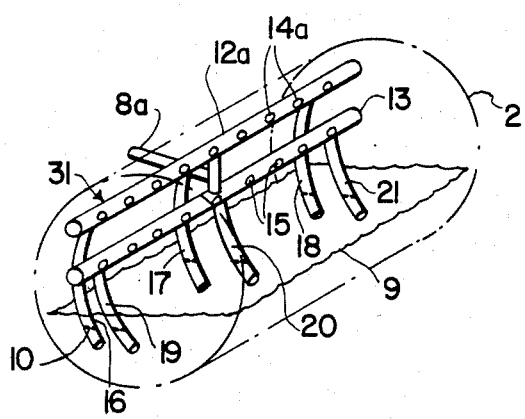
FIG. 3 is an isometric view of a distributor system intended for use in a two stage parallel treating vessel.

FIG. 3 illustrates a fluid distributor system 31 intended for use in a two stage parallel treating vessel. The reference numerals correspond to those employed in FIG. 2 for the same or similar features. However, in this embodiment, a short connecting pipe 36 places upper distributor chamber 12a in hydraulic communication with lower distributor 13, and the orifices 14a in upper chamber 12a are the same size as orifices 15 in lower chamber 13. Inlet means in this embodiment is provided by a short length of conduit 8a communicating with connecting pipe 36.

Figure 4:
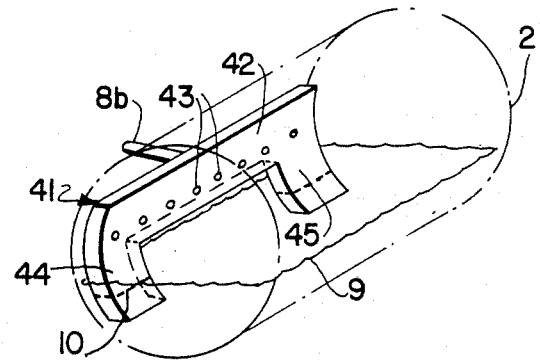
FIGS. 4, 5, and 6 are isometric views of respectively: another embodiment of the fluid inlet distributor of the present invention intended for use in a horizontal single stage treating vessel, shown in relation to the sides of such a vessel; a distributor system intended for use in a two stage series treating vessel; and a modification of the FIG. 4 embodiment intended for use in a two stage parallel treating vessel.

FIG. 4 illustrates another embodiment of the fluid inlet distributor of this invention for use in a single stage horizontal treating vessel. The distributor 41 of this embodiment consists of a horizontal elongated chamber 42 having an arcuate transverse cross-section and provided with a row of orifices 43, arcuate legs 44 and 45 at each end in communication with chamber 42, the arc of legs 44 and 45 being a continuation of the arc of chamber 42. Thus, the legs are disposed in an arcuately downward direction in planes perpendicular to the longitudinal axis of chamber 42. The arc is generally circular and adapted to be generally concentric with a side of the treating vessel when positioned therein adjacent to said side. The concave sides of the arc are on the same side of the distributor as the orifices 43. Chamber 42 is also provided with inlet means in the form of a short conduit 8b. Other reference numerals correspond to those employed in FIG. 1 for the same or similar features.

Figure 5:
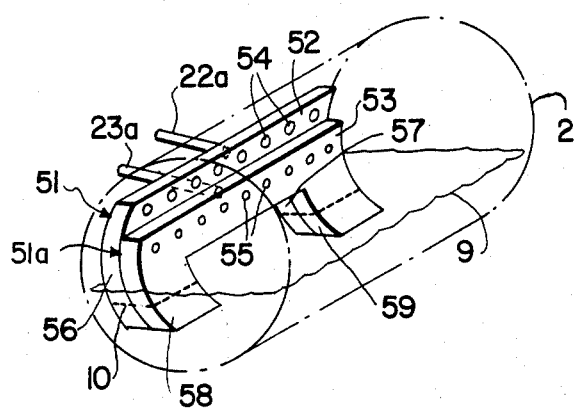

FIG. 5 illustrates a fluid distributor system, which, like that of FIG. 2, is intended for use in a two stage parallel treating vessel. As shown, this system comprises two distributors 51 and 51a of the type shown in FIG. 4, adapted for concentric placement in vertically spaced relationship at the side of treating vessel 2. As in FIG. 2, the upper distributor chamber 52 is provided with orifices 54 which are larger than orifices 55 provided in the lower distributor chamber 53. Alternatively, or in addition, a greater number of orifices may be provided in chamber 52 than in chamber 53. Distributor 51 is provided with arcuate legs 56 and 57, and distributor 51a with arcuate legs 58 and 59, the legs communicating hydraulically with the respective chambers. Inlet means, shown here as short conduits 22a and 23a, are provided for distributor chambers 52 and 53, respectively. Other reference numerals correspond to those employed in FIG. 1 for the same or similar features.

Figure 6:
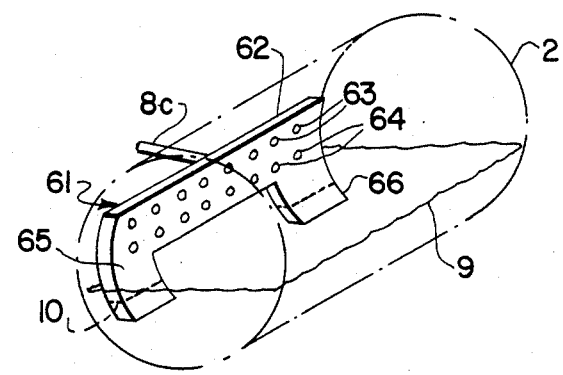

FIG. 6 illustrates a fluid distributor which, like the system of FIG. 3, is intended for use in a two stage parallel treating vessel. In this case, the distributor 61 comprises an elongated arcuate chamber 62 provided with two rows of orifices 63 and 64, arcuate legs 65 and 66 at each end communicating with chamber 62, and inlet means consisting of a short conduit 8c. Ohter reference numerals correspond to those employed in FIG. 1 for the same or similar features.

Figure 7:
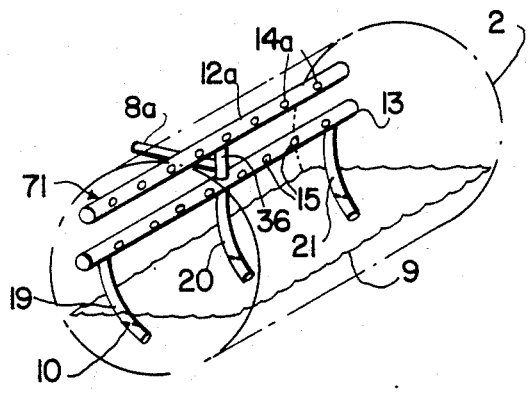
FIGS. 7 and 8 are isometric views of still further embodiments of the fluid inlet distributor of the present invention intended for use in a horizontal two stage parallel treating vessel, shown in relation to the sides of such a vessel.

FIG. 7 shows a variation of the embodiment of FIG. 3, the reference numerals corresponding to those employed for the same or similar features in FIG. 3. The distributor system 71 of FIG. 7 differs from that of FIG. 3 only in that conduits 16, 17, and 18 are omitted.

Figure 8:
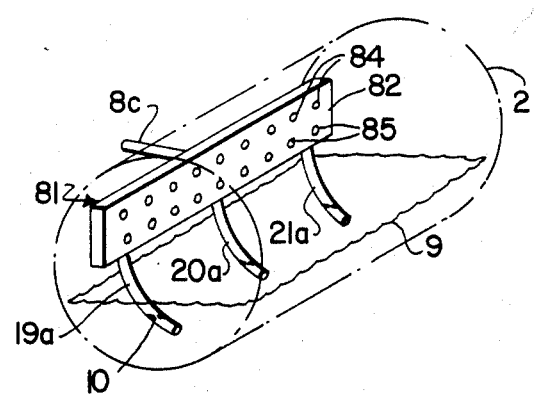

FIG. 8 illustrates still another embodiment of the invention intended for use in a two stage parallel treating system. In this embodiment, the distributor 81 comprises a horizontally elongated chamber 82 of rectangular transverse cross-section, having two horizontal rows of orifices 84 and 85 and provided with arcuate conduits 19a, 20a, and 21a of the same type as those shown in FIGS. 1, 2, 3, and 7, and inlet means in the form of a rearwardly extending short conduit 8c. Other reference numerals correspond to those employed in FIG. 1 for the same or similar features.

As used herein, the expression, "conduit", in reference to the downwardly extending conduits, is not intended to be restricted to any particular shape or form. It embraces the tubular conduits shown in FIGS. 1-4, 7 and 8, as well as the "legs" shown in FIGS. 5 and 6. It is required, however, that the conduits be open at their bottom ends. The number and positioning of the conduits along the chambers is not critical. Three conduits per chamber is ordinarily sufficient, although in very long distributors more may be used. Where conduits for more than one chamber are employed, the conduits need only be staggered an amount sufficient to accommodate all the conduits. The distributors shown in FIGS. 2 and 5, while intended primarily for use in a serial stage electrostatic treater, may be used in any type of treater which utilizes a higher flow rate in a upper stage.

Although, exemplary embodiments of the invention have thus been described, it will be understood that these may be subjected to various modifications and substitutions without departing from the spirit of the invention, which is defined by the appended claims.

I claim:

1. A fluid inlet distributor for a fluid treating vessel adapted to contain a body of oil and a body of a liquid of different gravity from said oil and immiscible therewith, said distributor comprising a chamber provided with at least one row of orifices disposed horizontally along a longitudinal side of said chamber, fluid inlet means to said chamber, and at least one conduit joined to said chamber in fluid communication therewith and extending downwardly from said chamber; said conduits being open at their bottom ends and said chamber being otherwise closed.

2. The fluid inlet distributor of claim 1, wherein said chamber is provided with one said row of orifices, and a plurality of said downwardly extending conduits.

3. The fluid inlet distributor of claim 2, wherein said chamber and said conduits are tubular and said conduits are disposed in an arcuately downward direction in planes perpendicular to the longitudinal axis of said chamber, the concave sides of the arcs being on the same side of the distributor as the orifice row.

4. The fluid inlet distributor of claim 2, wherein said chamber has an arcuate transverse cross-section and said conduits are disposed in an arcuately downward direction in planes perpendicular to the longitudinal axis of said chamber.

5. A fluid inlet distributor system for a two stage fluid treating vessel adapted to contain a body of oil and a body of a liquid of different gravity from said oil and immiscible therewith, said system comprising two distributors as defined in claim 2, said distributors fitting against each other but having the top of one extending above the top of the other, the orifice row of said one being in the portion thereof extending above said other and the orifice row of said other being unobstructed, said orifice rows facing in the same direction.

6. The fluid inlet distributor system of claim 5 wherein the orifices in the upper row are larger than those in the lower row.

7. The fluid inlet distributor system of claim 5 wherein there are more orifices in the upper row than in the lower row.

8. A fluid inlet distributor system for a two stage fluid treating vessel, comprising two distributors as defined in claim 2, said distributors sharing in part a common wall, but having the top of one extending above the top of the other, the orifice row of said one being in the portion thereof extending above said other, and the orifice row of said other being unobstructed.

9. The fluid inlet distributor system of claim 8 wherein the orifices in the upper row are larger than those in the lower row.

10. The fluid inlet distributor system of claim 8 wherein there are more orifices in the upper row than in the lower row.

11. The fluid inlet distributor of claim 1, wherein said chamber is provided with two said rows of orifices on one longitudinal side of said chamber and a plurality of said downwardly extending conduits, said orifice rows being in vertically spaced relationship and facing in the same direction.

12. The fluid inlet distributor of claim 11, wherein said chamber comprises an upper subchamber and a lower subchamber in fluid communication with each other, each subchamber is provided with one of said rows of orifices and said downwardly extending conduits are joined to said lower subchamber.

13. The fluid inlet distributor of claim 11, wherein said chamber comprises an upper subchamber and a lower subchamber, each said subchamber being in fluid communication with common inlet means, each said subchamber being provided with one of said rows of orifices, and with said downwardly extending conduits.

14. The fluid inlet distributor of claim 11, wherein said chamber has a rectangular transverse cross-section.

* * * * *